(12) United States Patent
Williams (10) Patent No.: US 6,505,843 B1
(45) Date of Patent: Jan. 14, 2003

(54) DEVICES AND METHODS FOR TRANSPORTING CONTAINERS

(76) Inventor: Dale Williams, 184 Ponce de Leon Pl., Apt. 410, Atlanta, GA (US) 30306

( * ) Notice: Subject to any disclaimer, the term of this patent is extended or adjusted under 35 U.S.C. 154(b) by 0 days.

(21) Appl. No.: 09/747,006

(22) Filed: Dec. 22, 2000

(51) Int. Cl.$^7$ ................................................. B62B 1/20
(52) U.S. Cl. ..................................... 280/47.26; 280/652
(58) Field of Search .......................... 280/646, 47.23, 280/47.26, 47.28, 35, 651, 652, 47.24, 655

(56) References Cited

U.S. PATENT DOCUMENTS

| | | | |
|---|---|---|---|
| 780,777 A | * | 1/1905 | Colling .................... 280/47.23 |
| 1,255,070 A | * | 1/1918 | Waller ......................... 280/652 |
| 2,077,349 A | * | 4/1937 | Hobbis ........................ 280/652 |
| 2,717,785 A | * | 9/1955 | Ray ............................. 280/646 |
| 2,770,466 A | * | 11/1956 | Pearson et al. ............. 280/646 |
| 2,835,501 A | * | 5/1958 | Chamberlin et al. ........ 280/652 |
| 3,612,482 A | | 10/1971 | Eck |
| 3,871,725 A | | 3/1975 | Vilen et al. |
| 3,875,981 A | | 4/1975 | Brenner et al. |
| 3,926,452 A | | 12/1975 | Goines |
| 4,313,701 A | | 2/1982 | Brust |
| 4,319,761 A | | 3/1982 | Wells |
| 4,353,596 A | | 10/1982 | Gibson |
| 4,453,876 A | | 6/1984 | Arpin |
| 4,511,154 A | | 4/1985 | Daloisio |
| 4,576,237 A | | 3/1986 | Arney |
| 4,861,110 A | | 8/1989 | Rumpke |
| 5,149,116 A | | 9/1992 | Donze et al. |
| 5,183,280 A | | 2/1993 | Gresch |
| 5,366,189 A | | 11/1994 | Thompson |
| 5,464,102 A | | 11/1995 | LeBlanc et al. |
| 5,469,944 A | | 11/1995 | Wang |
| 5,568,848 A | | 10/1996 | Liang |
| 5,845,951 A | | 12/1998 | Webb |
| 5,938,396 A | * | 8/1999 | Auder ..................... 280/47.28 |
| 6,041,945 A | | 3/2000 | Faraj |
| 6,056,177 A | | 5/2000 | Schneider |
| 6,158,762 A | * | 12/2000 | Wong ......................... 280/652 |

OTHER PUBLICATIONS

"MicroMover Fold–Away Carry–On Cart," http://www.samsonitecompanystores.com/CGI–BIN/LANSAWEB-?PROCFUN+UTILITY+REDIR+WBP+ENG, Nov. 12, 2001, p. 1.

* cited by examiner

Primary Examiner—Avraham Lerner
(74) Attorney, Agent, or Firm—Geoff L. Sutcliffe; Kilpatrick Stockton LLP (57) ABSTRACT

A device for transporting a container includes a frame and a boom coupled to the frame for maintaining a container in an upright position during movement of the device. The device prevents contents of the container from spilling during transport. The device is collapsible so that it can be easily and compactly stored when not in use.

12 Claims, 14 Drawing Sheets

DEVICES AND METHODS FOR TRANSPORTING CONTAINERS

FIELD OF THE INVENTION

The invention relates generally to methods and devices for transporting goods and, more particularly, to methods and devices for transporting containers so that they remain substantially level during transport, which is especially beneficial in transporting containing having liquids or solids.

BACKGROUND OF THE INVENTION

Oftentimes, a person may need to have a bucket of material available in order for a person to complete a task. For example, painters purchase large buckets of paint in order to reduce their costs. As another example, an installer of drywall commonly has a large bucket of drywall paste, commonly referred to as "mud," which the installer uses in covering seams between pieces of drywall. Buckets are not only used in the construction industry but are also commonly used in other industries, such as the food and beverage industry. Marinated chicken, marinara, cheese, and other food supplies are commonly bought and kept in stock in large buckets. As can be appreciated, many people in their jobs as well as other times have an occasion to use a bucket or other similar type of container.

While large containers such as a bucket are convenient in that they can store large quantities of material, these containers are rather difficult to transport. Typically, a handle is integrally formed with the bucket and a person uses this handle in carrying the bucket from one place to the next place. Carrying a bucket by its handle, however, is rather burdensome and difficult. A heavy bucket is not easily carried since a person lifts the bucket and places the bucket away from his or her body, thereby presenting some torsional forces upon the person. For instance, if the bucket is held in front of the person, these forces would create a strain on the person's back. To align the bucket with the person's center of gravity, the person would need to position the bucket between his or her legs, which would render it difficult to walk and carry the bucket at the same time.

Various devices are known to assist a person in carrying buckets or other containers. One of these devices is a simple cart upon which the container is placed. The cart has wheels that allow the user to easily move the heavy container from one location to another. Other types of devices have wheels for transporting the container and some type of surface for supporting the container. These types of devices alleviate to some degree the burden and strain placed on a person in transporting the containers. These devices, however, are still inadequate for transporting many types of materials because they fail to maintain the container substantially upright or level during travel. For example, when the container is not completely sealed, such as when its lid is off, the material within the bucket can easily leave the bucket during transport.

SUMMARY OF THE INVENTION

The present invention addresses the problems described above by providing devices and methods for transporting containers which are able to maintain the containers substantially level during transport. A device according to a preferred embodiment includes a frame, at least two legs coupled to the frame and having wheels, and a boom coupled to the frame. The device is transported by grasping the frame and moving the frame along a surface, with the wheels rolling along the surface. Advantageously, the boom carries the container so that the container is maintained in a substantially upright position during transport. Thus, even though the surface may be angled, the device is capable of keeping the container substantially level. As can be appreciated, the device is especially well suited for containers having liquids or even some solids, since the device can help minimize any losses of contents during transport.

According to another aspect, a device according to the invention includes a frame, a boom coupled to the frame, and at least two legs each attached to the frame and having a wheel. The boom includes structure that allows a container to be fastened to the device in a secure manner. The legs are moveable with respect to each other such that they can be separated from each other during use and can be moved toward each other during storage. Preferably, the boom can be pivoted relative to the frame and the legs can be pivoted relative to the frame so that the entire device can form a compact structure during storage. To even further reduce the size of the device, the legs may be telescopic such that they can be extended during use but collapsed during storage.

The container can be coupled to the boom in any suitable manner. For instance, the boom can include structure that allows the container to pivot during transport. The boom could have a U-shaped support rotationally coupled to the frame. The boom may further include multiple attachment points for attaching multiple containers.

In yet another embodiment of the invention, the device may include an attachment removably connected to at least one of the legs. The attachment is preferably a collapsible assembly which attaches to at least one of the legs and allows the device to remain upright unassisted. The attachment may further include a swiveling wheel to aid in turning the device.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings.

DETAILED DESCRIPTION

Figure 1A:
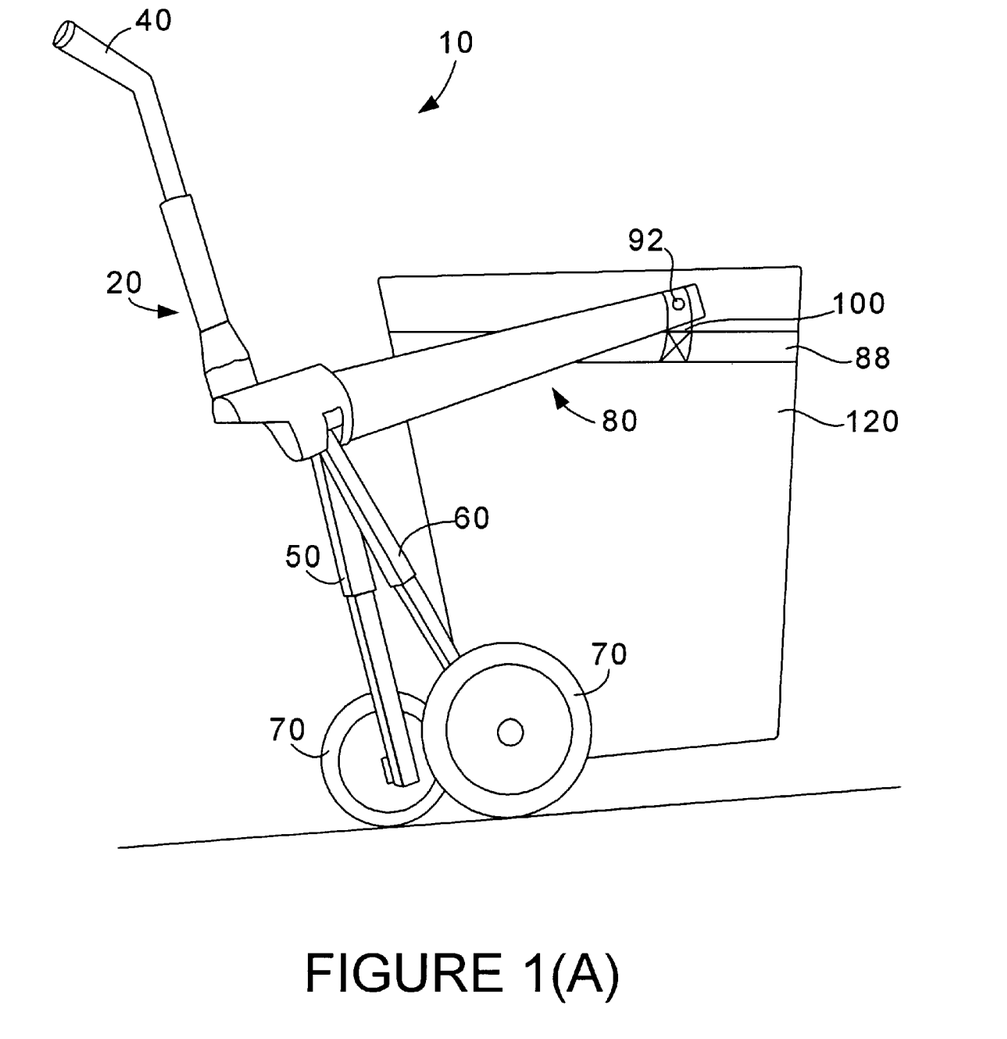
FIGS. 1(A) and (B) are perspective views of a device according to one embodiment of the present invention.
Figure 1B:
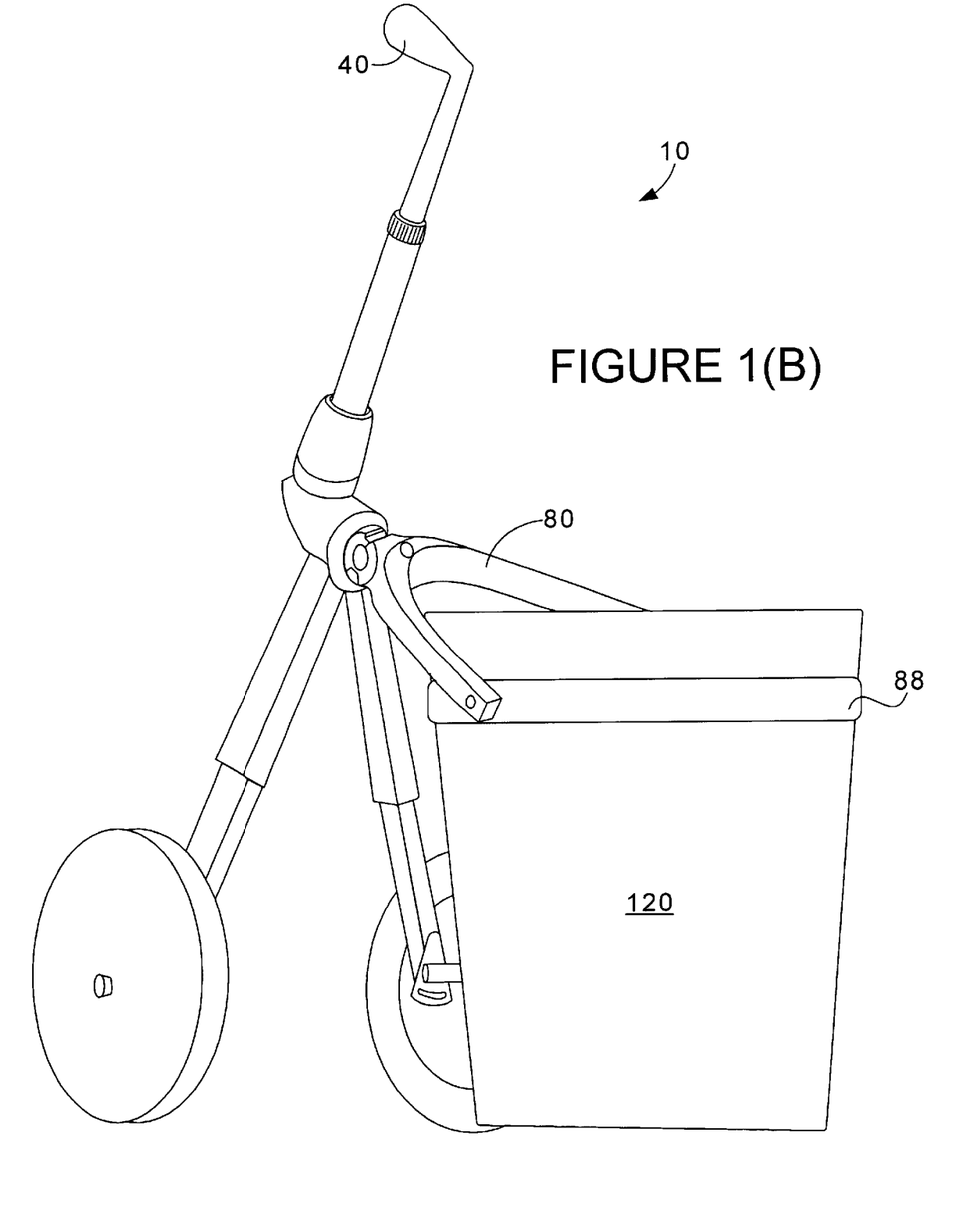

Reference will now be made in detail to preferred embodiments of the invention, non-limiting examples of which are illustrated in the accompanying drawings. With reference to FIGS. 1(A) and (B), a device 10 includes a frame 20, a boom 80 coupled to the frame 20, and two leg assemblies 50 and 60. The boom 80 can be connected to the frame 20 in any suitable manner but is preferably mounted so that the boom 80 can pivot relative to the frame 20. The components forming the device 10, including the frame 20, boom 80, and leg assemblies 50 and 60, may be constructed from any suitable material, such as aluminum, titanium, other metal, or plastic. The device 10 is used to transport a container 120 that may be coupled to the boom 80.

With reference to FIG. 1(A), the device 10 in this embodiment of the invention has the container 120 coupled to the boom 80 with a support 88. The support 88 may comprise a strap that can be tightly securely around the container 120 and is secured to the boom 80 through posts 92A and 92B and members 100A and 100B. The members 100A and 100B are secured to either side of the boom 80 and are secured to the support 88 through the posts 92A and 92B, respectively. The posts 92A and 92B allow the hook and strap members 100A and 100B to move relative to the support 88 in response to movements of the container 120. Advantageously, when the device 10 is transported over inclined surfaces, the hook and strap members 100A and 100B, in cooperation with the posts 92A and 92B, allow the container 120 to respond to gravitational forces, whereby the container 120 may remain level during transport. While the hook and strap members 100A and 100B are preferably connected to the support 88 with posts 92A and 92B, the hook and strap members 100A and 100B may be connected in other ways to the support 88 that allow relative movement. Examples of such structure to connect the hook and strap members 100A and 100B to the support 88, include pins, a ring, fasteners, welds, etc. As should be apparent to those skilled in the art, the hook and strap members 100A and 100B may themselves be flexible and allow relative movement between the container 120 and the boom 80, thereby eliminating the need for any intermediate structure.

To attach the container 120 to the device, with reference to FIG. 1(A), the support 88 is positioned around the container 120. Preferably, the container 120 is positioned on a stable surface while securing the container 120 to the device 10. After the container 120 is secured, the device 10 may be moved to transport the container 120 to a desired location. During transport, as shown in FIG. 1(B), a user can grasp the frame 20, preferably at a handle 40, and pull or push the device 10 to the desired location. The leg assemblies 50 and 60 have wheels 70 to facilitate movement of the device 10.

Figure 2A:
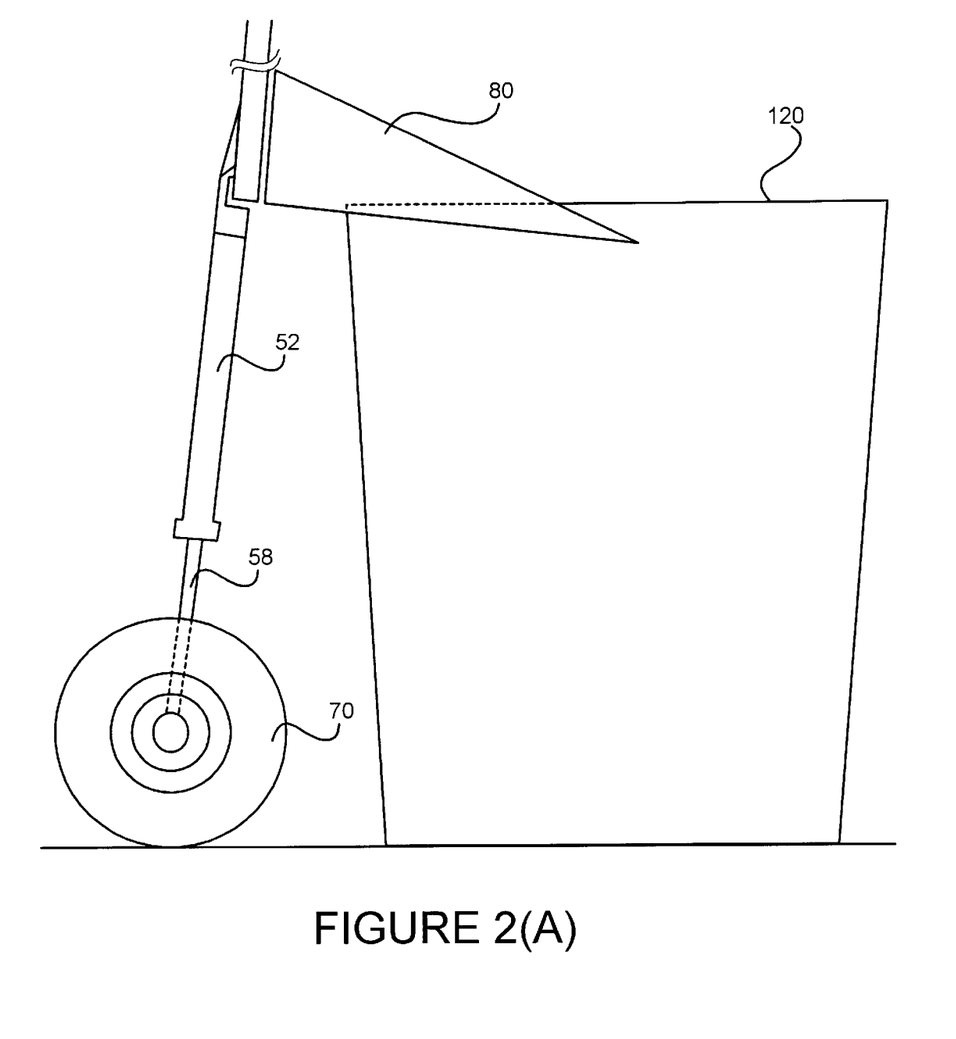
FIGS. 2(A) and (B) are side views of the device operating on surfaces having different inclines.
Figure 2B:
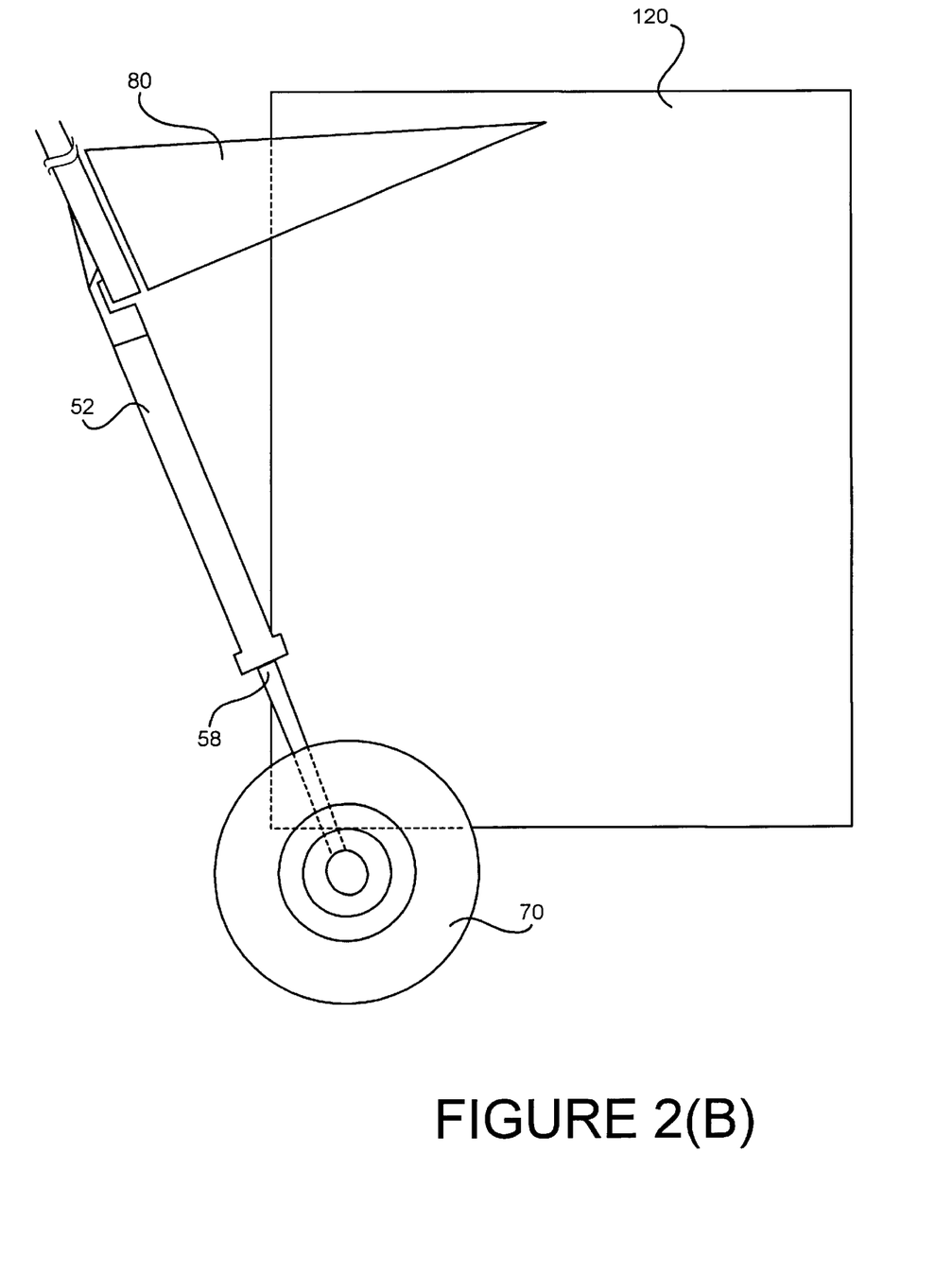

FIG. 2(A) illustrates an enlarged view of the device 10 and the container 120 with the container 120 resting on a surface. FIG. 2(B) illustrates use of the device 10 on an inclined surface. As shown in this figure, the device 10 facilitates movement of the container 120 and allows the container 120 to respond to gravitational forces so that it can remain level. Consequently, contents of the container 120, such as liquids or even some solids, can remain within the container 120 and do not spill out while the container 120 is moved to the desired location.

Figure 3A:
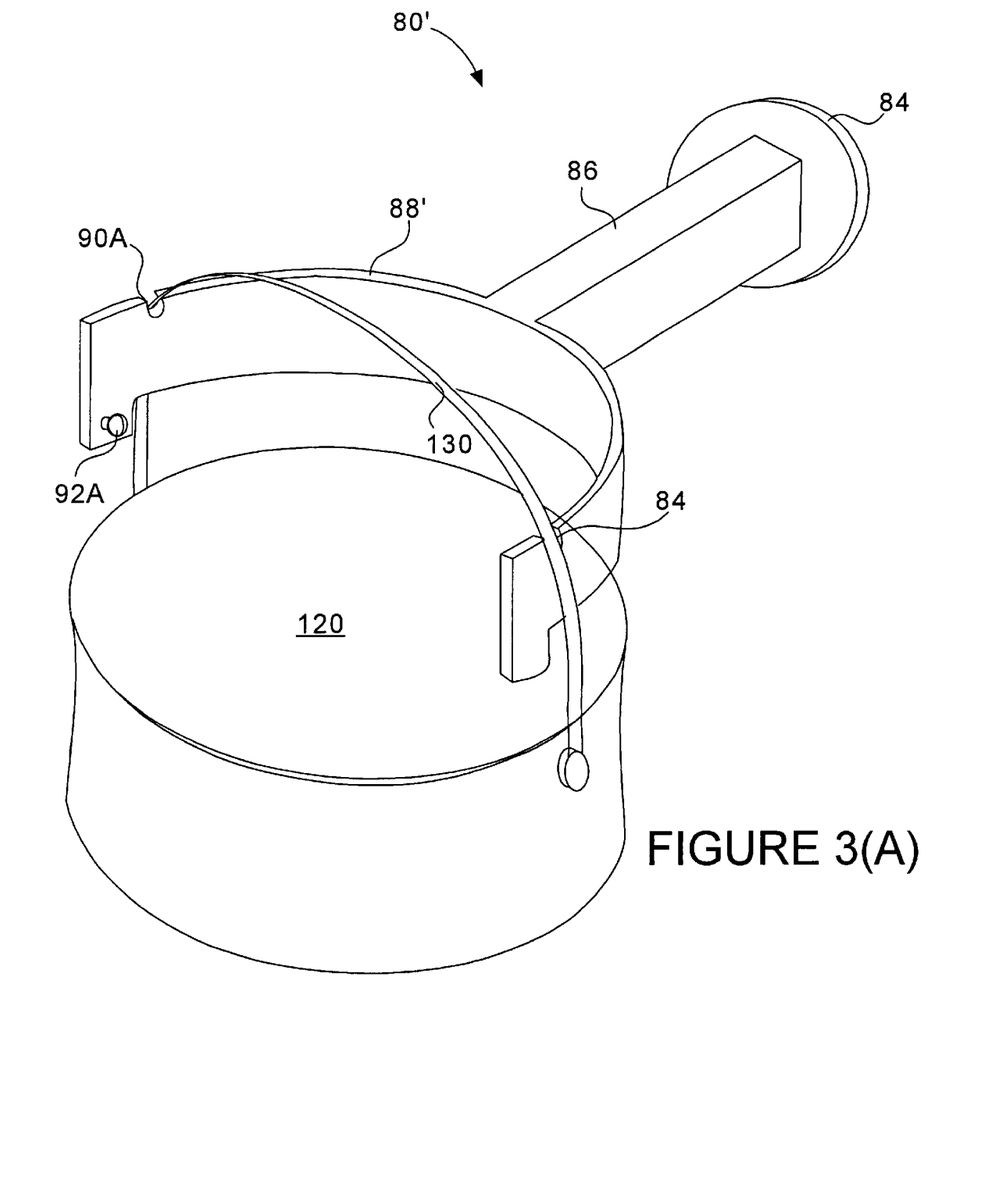
FIGS. 3(A) and (B) are partial views of the device showing a boom in an open and closed position, respectively.

In the embodiment shown in FIGS. 1 and 2, the container 120 is secured to the boom 80 through a support 88. The invention is not limited to this particular structure but instead encompasses any type of structure that allows the container 120 to be secured to the boom 80 and which allows the container 120 to move relative to the boom 80 during transport. For example, as shown in FIG. 3(A), a boom 80' may have a U-shaped support 88', extension member 86, base 84, and notches 90A and 90B for receiving a portion of the container 120, such as a handle 130 of the container 120. The extension member 86 connects and is integrally formed with the base 84 and support 88. The substantially circular base 84 mounts into a substantially circular cavity in the frame 20 permitting the boom 80 to rotate around the body. The support 88 is preferably U-shaped. In this embodiment, the handle 130 of the bucket 120 is positioned within the notches 90A and 90B and is secured to the device 10 without the need for the members 100A and 100B and posts 92A and 92B. As will be appreciated by those skilled in the art, the size and shape and the U-shaped boom 80' may vary depending upon the size and weight of the container 120. In other words, container 120 having larger diameters can be secured to the device 10 with larger sized booms 80'.

Figure 3B:
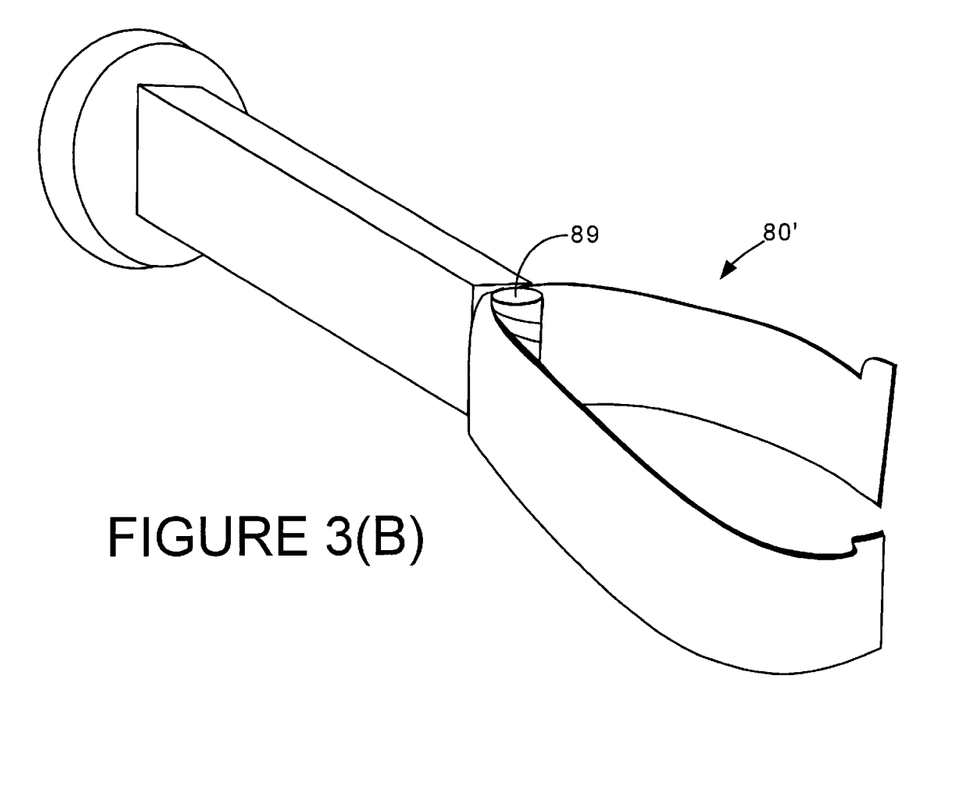

With reference to FIG. 3(B), the U-shaped boom 80' is preferably collapsible about a center portion so that the entire structure can be reduced in size. As will be explained in greater detail below, the device 10 not only allows the container 120 to remain substantially level during transport, but the device 10 can be reduced in size while not in use so as to reduce the amount of space the device 10 consumes in storage. The ability to fold the boom 80' upon itself aids in reducing the amount of storage space required for the device 10.

Figure 4A:
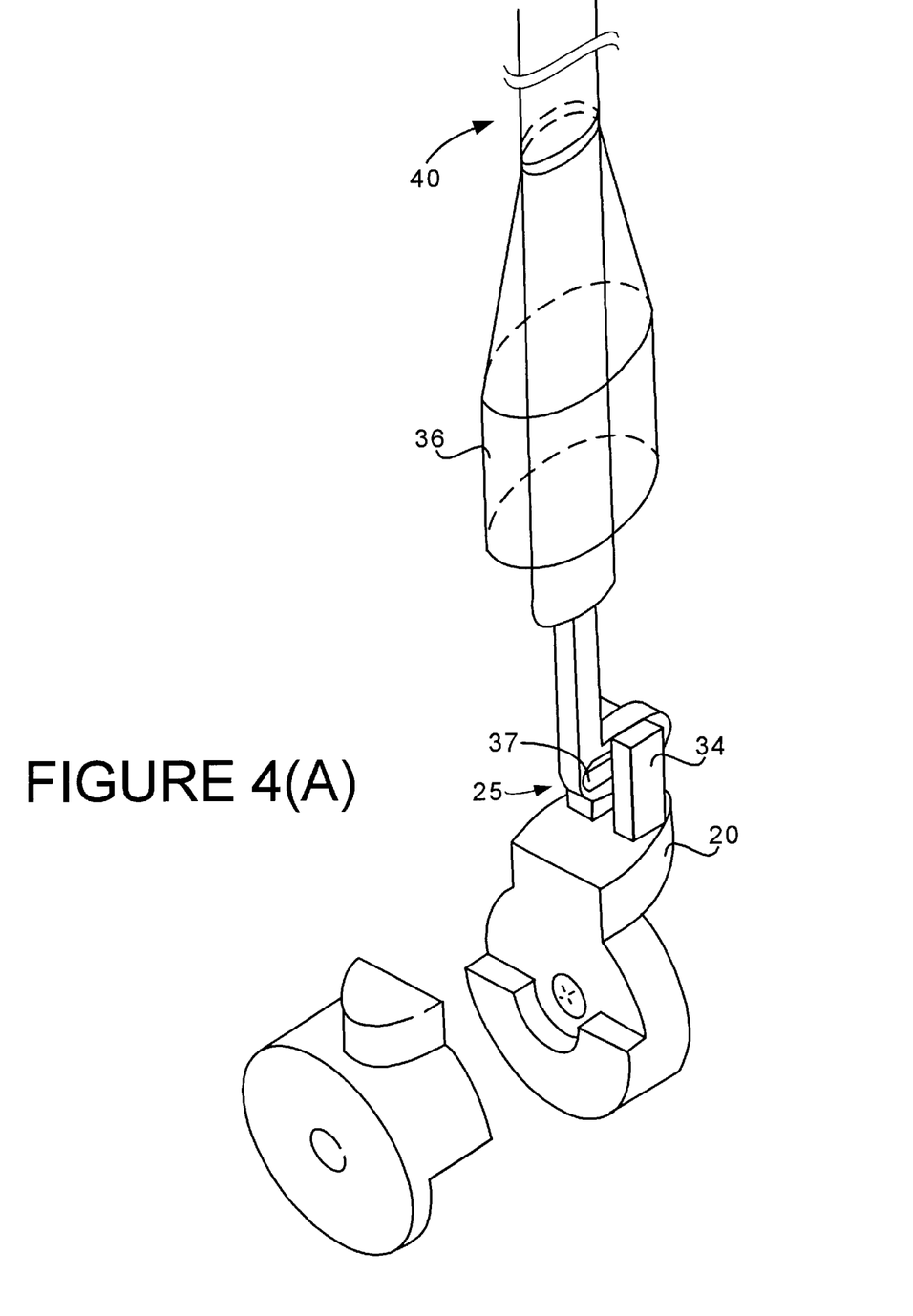
FIGS. 4(A) and 4(B) are exploded views of a handle neck assembly in a raised and lowered positions, respectively.
Figure 4B:
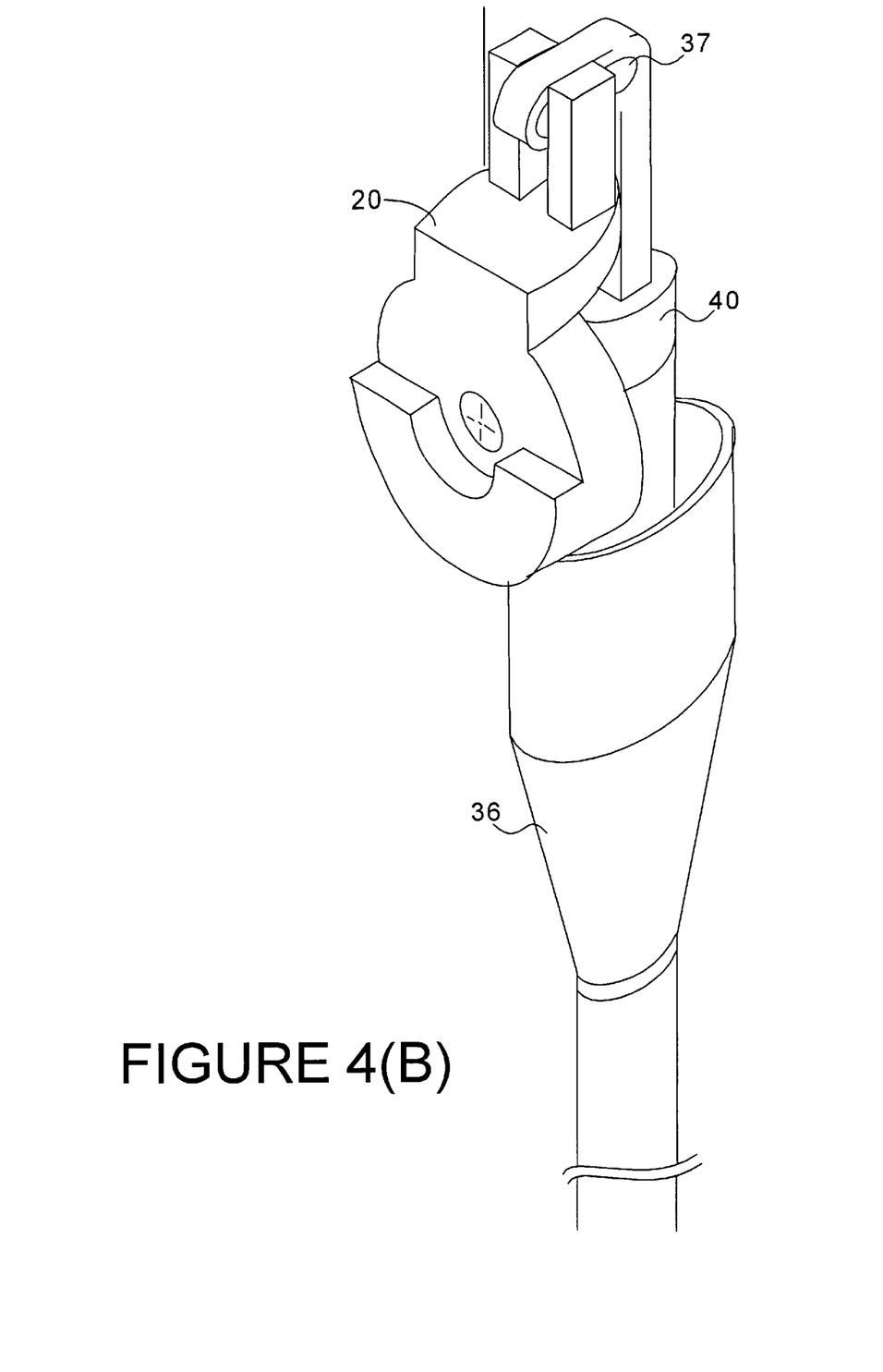

As mentioned above, the boom 80', as well as boom 80, preferably can be reduced in size during storage of the device 10. Other portions of the device 10 can also be repositioned during storage to further reduce the storage space. With reference to FIGS. 4(A) and 4(B), the handle 40 can fold upon the frame 20 to reduce the storage space. The handle 40 is secured to the frame 20, preferably in a threaded relationship, by a neck 34 having a collar 36. This collar 36 is fastened to the frame 20 but can be released in order to pivot the handle 40 toward the frame 20. FIG. 4(A) illustrates the collar 36 released from the frame 20 and raised from the neck 34. The neck 34 is connected to the frame 20 with a joint 25 which in the preferred embodiment, is formed by a slot 37 in the neck 34 and a pin in the frame 20. Once the collar 36 is raised, the pin can travel within the slot to allow the handle 40 to pivot toward the frame 20. In addition to pivoting toward the frame 20, the handle 40 is preferably telescopic or can have its length reduced in size in other ways.

Figure 5:
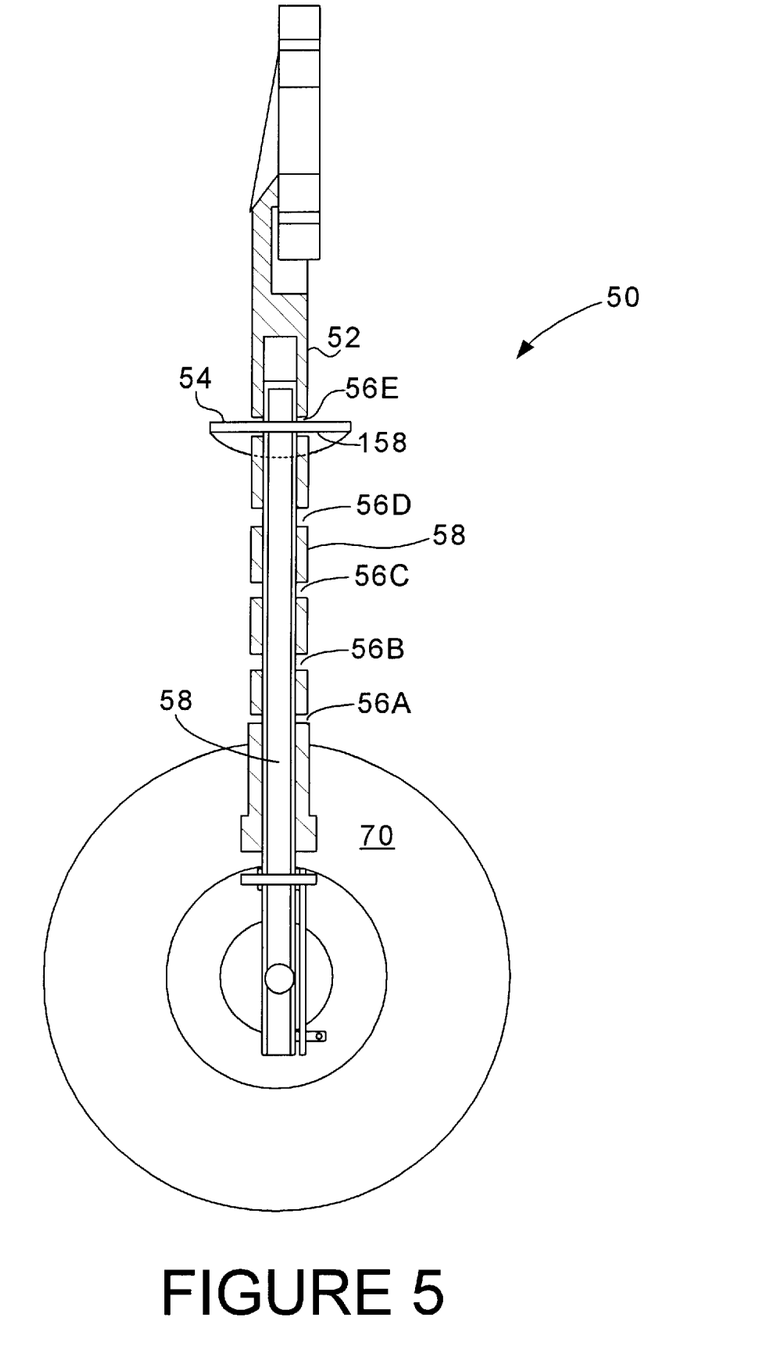
FIG. 5 is a side perspective view of the upper frame section illustrating the telescoping handle in the collapsed position.

In addition to the handle 40 and the boom 80, the leg assemblies 50 and 60 also preferably are moveable to reduce storage space. With reference to FIG. 5, an explanation will now be given with respect to a preferred manner in which each leg assembly 50 and 60 can be reduced in size. Since the leg assemblies 50 and 60 are similar in structure, the explanation will focus on just one of the leg assemblies, namely leg assembly 50. The leg assembly 50 includes a sleeve 52, a rod 58, a fastener 54, and a wheel assembly 70. The rod 58 is housed within the sleeve 62 and moves telescopically therein. To secure the rod 58 after adjusting it telescopically, the rod 58 has at least one aperture 158 and the sleeve 52 forms a series of apertures 56A–E. The fastener 54 having two ends includes a chain terminating in a clip attached to one of its ends using any suitable fastener, such as through welding or pins. The fastener 54 is inserted into one of the apertures 56A–3 and through the aperture 158 for securing the rod 58. After insertion, the clip may be clamped to an opposing end of the fastener 54 from the attachment point of the chain. Although one desired embodiment for securing the rod within the sleeve has been described, other structure may be used. As an example, a releasable rod-sleeve arrangement taking the form of the rod 58 having teeth that engage corresponding teeth on the interior of the sleeve 52 could be used. The leg could be secured with a pin that, when released from within an aperture, allows the leg to move but, when inserted into an aperture, prevents any movement of the leg. The wheel assembly 70 may be connected to the rods 58 using any suitable fastener or couples such as rivets, bolts, or welds, such as a spring loaded pin which when depressed releases leg so they can slide in sleeve or release the pin and spring secures the pin and the leg in place. Optionally, a brake 140 and/or lock may be included with the wheel assembly 70.

Figure 6:
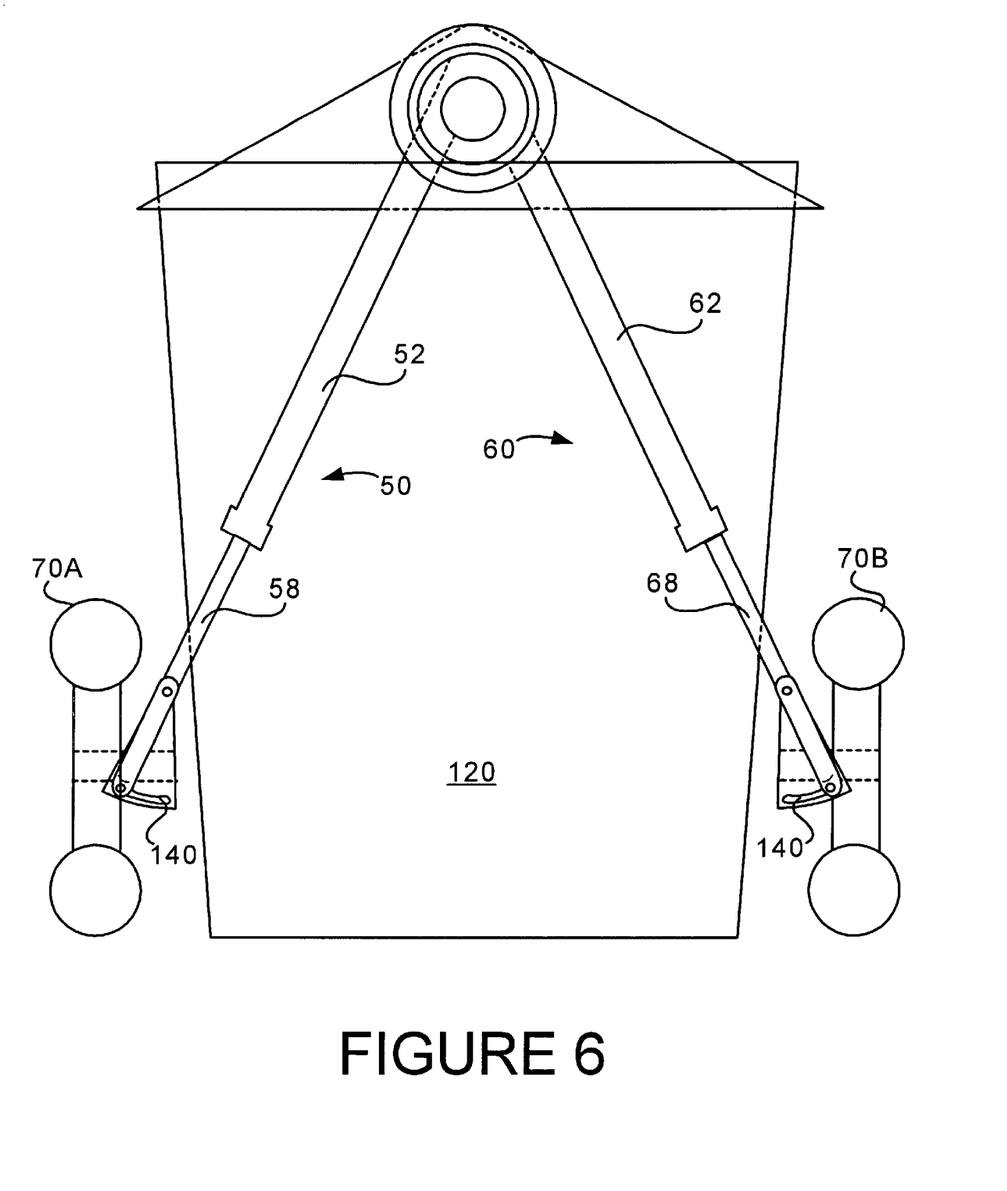
FIG. 6 is a rear, cross-sectional view of a portion of the frame illustrating the leg assemblies in an open position.
Figure 7:
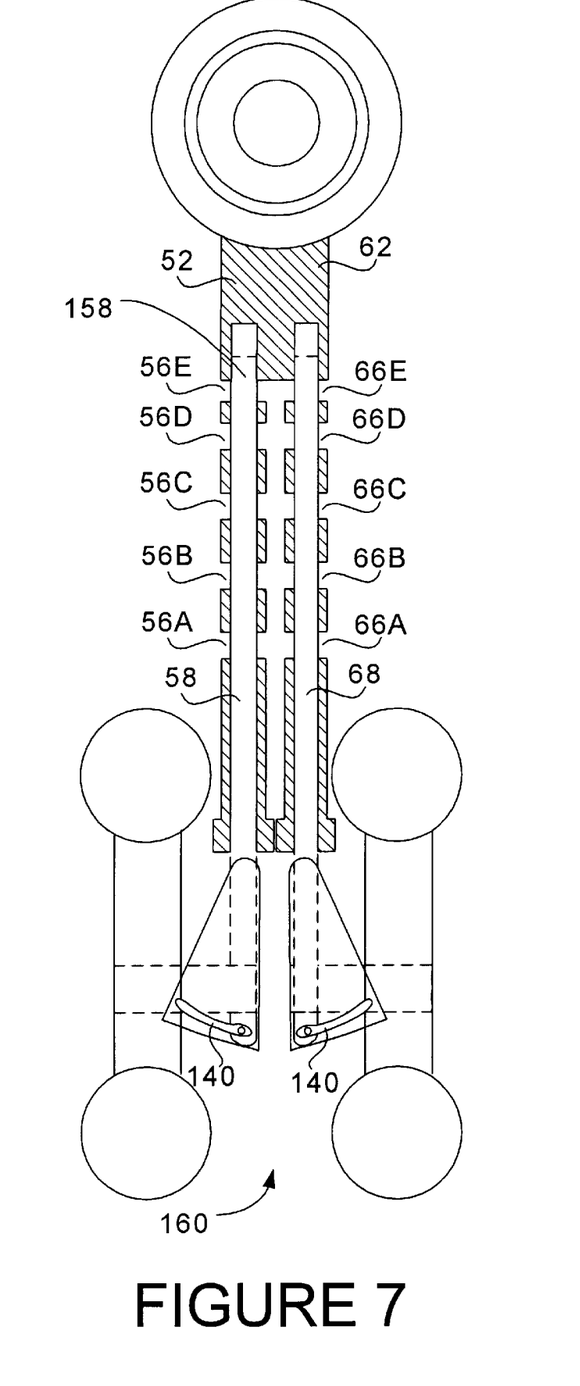
FIG. 7 is a front, cross-sectional view of a portion of the frame illustrating the leg assemblies in a closed position.

After the container 120 has been moved into its desired position, the container 120 may be lowered as depicted in FIG. 1(B), and the container 120 removed from the boom 80 as readily understood by one skilled in the art. The leg assemblies 50 and 60 can be pivotally moved into a closed position as depicted in FIG. 7. Once the legs are collapsed collar 36B is uncoupled and moved up the handle 34 as depicted in FIG. 4(A). Further minimizing the total length. Handle 34 can pivotally move into alignment with leg assemblies 50 and 60. The leg assemblies 50 and 60 can be moved away from each other during use but can be moved toward each other for storage. The leg assemblies 50 and 60 are therefore pivotally coupled to the frame 20. FIG. 6 illustrates the leg assemblies 50 and 60 in an open position 150 and FIG. 7 illustrates the leg assemblies 50 and 60 in a closed position.

Figure 8:
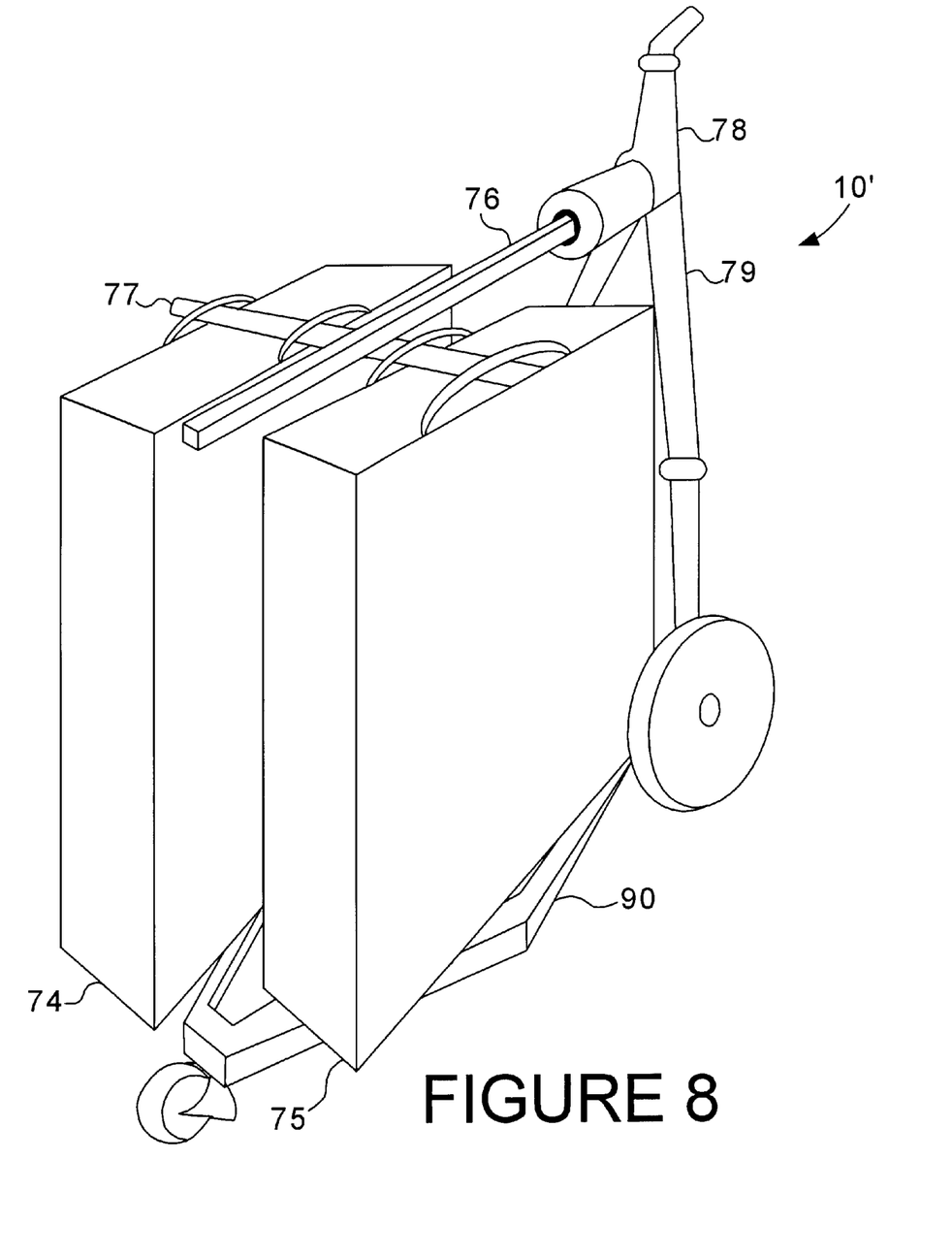
FIG. 8 is a perspective view of a device having an attachment according to another embodiment of the present invention.
Figure 9A:
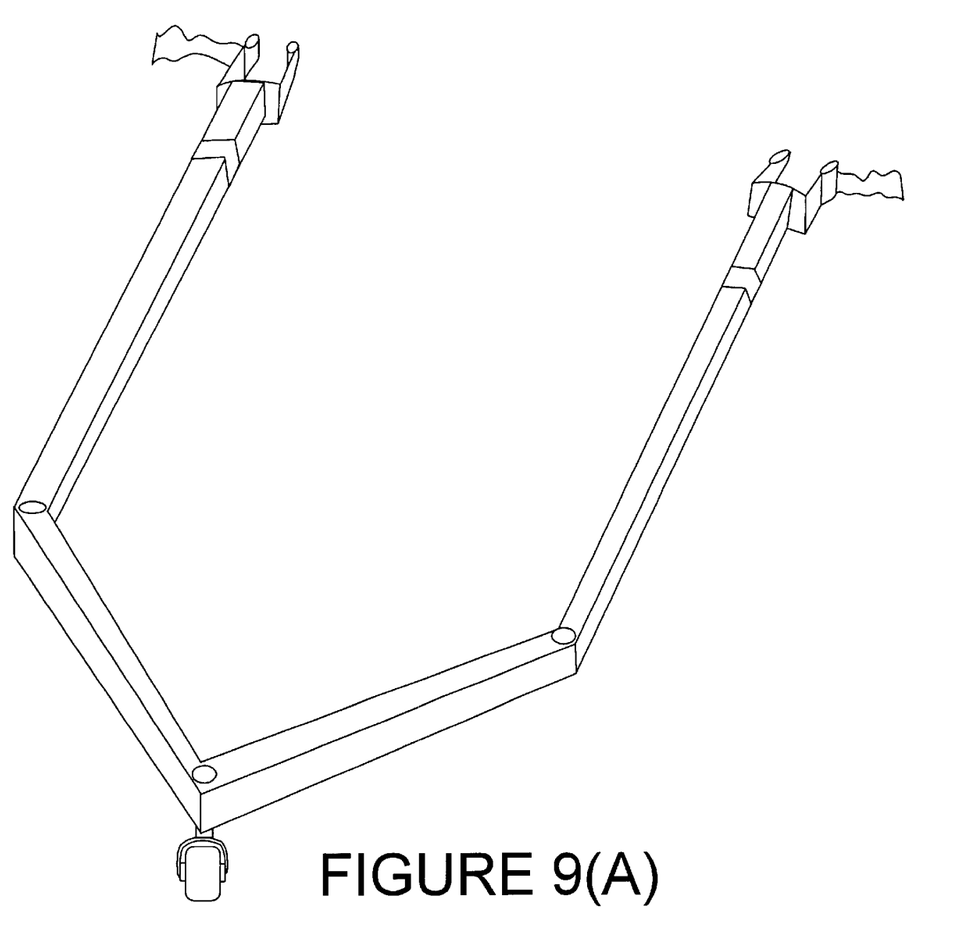
FIG. 9(A) is a perspective view of an attachment in an open position.

With reference to FIG. 8, a device 10' according to yet another embodiment of the invention may include an attachment 90 to provide support for containers, such as one or more bags 74 and 75. In this embodiment, the device 10' includes a boom 76 having a base 79, a neck 78, and a rod 77. The attachment 90 fastens to at least one of the leg assemblies, and preferably both of the leg assemblies 50 and 60. While the attachment 90 can be secured in any suitable manner, the attachment has clips 92 and 93 that fasten to the leg assemblies 50 and 60. As best seen in FIG. 9(A), the clips 92 and 93 have straps 94 and 95, respectively, which can be wrapped around the leg assemblies 50 and 60. These straps 94 and 95 are not necessary, but do provide for a more secure attachment. The attachment 90 further comprises a swivel wheel 91 to facilitate movement of the device 10' along a surface and also to provide for additional support. The container, such as bags 74 and 75, may rest upon the attachment 90 and may also, but not necessarily, also be supported by the boom 76.

Figure 9B:
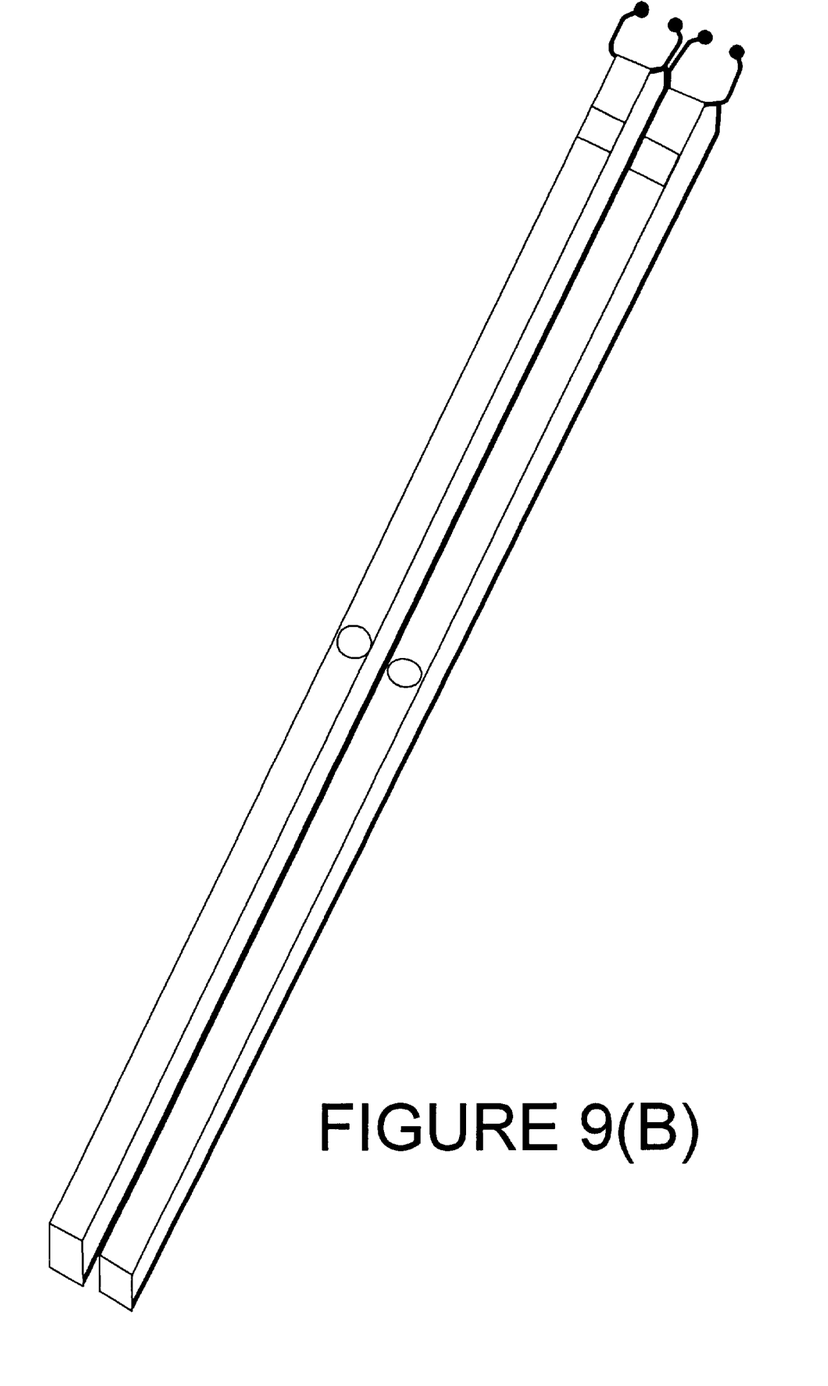
FIG. 9(B) is a perspective view of an attachment in a closed position.

As with other structure in the device 10, the attachment 90 is preferably collapsible to reduce storage space. With reference to FIG. 9(B), the attachment 90 is formed from a plurality of members 90A to 90D. Each of the members 90A to 90D are interconnected through one of a plurality of hinges 96A to 96E. These hinges 96A to 96E allowing the attachment 90 to fold into the shape shown in FIG. 9(B), which is significantly smaller than the fully extended shape shown in FIG. 9(A).

Furthermore, the handle 40 may be adjusted by loosening the collar 36 and sliding the handle 40 within the neck 34. Once the handle 40 is at a desired position, the collar 36 may be tightened. Furthermore, the rods 58 and 68 within the leg assemblies 50 and 60 may be positioned by sliding within the sleeves 52 and 62. The rods may be fastened in position by releasing a clip off of the end of the fastener 54 or 64, removing it from the sleeve 52 or 62, positioning the rod 58 or 68, reinserting the fastener 54 or 64 to secure the rod 58 or 68, and reattaching the clip. After fastening the container 120 to the device 10 and, if desired, adjusting the handle 40 and rods 58 and 68, the leg assemblies 50 and 60 may be moved pivotally opened to permit the movement of the container 120, as depicted in FIG. 3. Alternatively, the attachment 90 may be utilized to allow the device 10 to be self supporting, as depicted in FIG. 8.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilities the invention and various embodiments and with various modifications as are suited to the particular use contemplated.

I claim:

1. A device for transporting a container over a surface to a desired location, comprising:

a frame;

a handle coupled to the frame, the handle for being held by a user and permitting the user to maneuver the device over the surface to transport the container to the desired location;

a first joint for coupling the handle to the frame and for permitting the handle to pivot:
  from a first position, where the handle is moved away from the fame so that the user can hold the handle during use of the device,
  to a second position where the handle is moved toward the frame;

at least two leg assemblies coupled to the frame and having wheels for facilitating movement of the device along the surface;

a second joint for coupling the leg assemblies to the frame, the second joint permitting the leg assemblies to pivot:
  from an open position where the leg assemblies are pivoted away from each other during use of the device,
  to a closed position where the leg assemblies are pivoted toward each other when the device is not in use; and a boom coupled to the frame having structure for being coupled to the container and for suspending the container;

the boom extending away from the frame;

the structure of the boom for suspending the container and for permitting portions of the container not coupled to the structure to move relative to the device during transit;

the structure for suspending the container such as to permit the portions of the container not coupled to the structure to move in all directions; and wherein the structure of the boom suspends the container such that the container can move in one or more of the directions to remain substantially level during changes in pitch and yaw of the device.

2. The device of claim 1, wherein the frame further comprises:
a body:
a neck integrally formed with the body; and
at least one leg assembly coupled to the body.

3. The device of claim 2, wherein the boom is coupled to the body.

4. The device of claim 2, wherein the frame further comprises a handle and the neck further comprises a collar and forms a passage; and
the handle inserts into the passage, is telescopic, and is secured with the collar.

5. The device of claim 1, wherein the boom further comprises a support and first and second members; the first and second members are pivotally attached to the support.

6. The device of claim 1, wherein the boom is rotationally coupled to the frame.

7. The device of claim 2, wherein each leg assembly further comprises a sleeve housing a telescopic rod coupled to a wheel;
the telescopic rod having a plurality of positions for placing the leg assembly at any one of a plurality of lengths of the leg assembly;
a first position fixing the length of the leg assembly at a first length and placing the boom at a first height;
a second position fixing the length of the leg assembly at a second length and placing the boom at a second height;
wherein the plurality of lengths of the leg assemblies allows the boom to suspend loads of varying sizes.

8. The device of claim 5, wherein the boom further comprises a third member coupled to at least one of the first and second members.

9. The device of claim 8, wherein the third member is a ring.

10. A device for transporting a container over a surface to a desired location, comprising:
a frame;
a handle connected to the frame for being grasped during transport of the container;
a first joint for coupling the handle to the frame and for permitting the handle to pivot:
from a first position, where the handle is moved away from the frame so that the user can hold the handle during use of the device,
to a second position where the handle is moved toward the frame;
a boom coupled to the frame for supporting the container;
at least two leg assemblies coupled to the frame and having wheels for facilitating movement of the container over the surface, each leg assembly having:
a sleeve housing a telescopic rod coupled to a wheel;
the telescopic rod having a plurality of positions for placing the leg assembly at any one of a plurality of lengths of the leg assembly;
a first position fixing the length of the leg assembly at a first length and placing the boom at a first height;
a second position fixing the length of the leg assembly at a second length and placing the boom at a second height;
wherein the plurality of lengths of the leg assemblies allows the boom to suspend loads of varying sizes;
a second joint for coupling the leg assemblies to the frame, the second joint permitting the leg assemblies to pivot:
from an open position where the leg assemblies are pivoted away from each other during use of the device,
to a closed position where the leg assemblies are pivoted toward each other when the device is not in use;
wherein the leg assemblies are pivotal towards each other such that the leg assemblies may be moved toward each other during storage and away from each other during use of the device; and
wherein the handle is pivotal towards the frame such that the handle maybe lowered during storage of the device and raised during use of the device.

11. The device of claim 10, where the boom has an end for suspending the container, the end comprising a pair of arms pivotally mounted relative to each other which may be spaced apart at any one of a plurality of distances to accommodate a range of sizes for the container.

12. The device of claim 10, wherein the handle comprises a telescoping rod having a plurality of positions for setting a length of the handle at any one of a plurality of different lengths.

* * * * *